Feb. 12, 1957 A. BAHR 2,781,173
STEAM TRAP
Filed Aug. 15, 1956 2 Sheets-Sheet 1

INVENTOR
Alfred BAHR

BY
ATTORNEYS

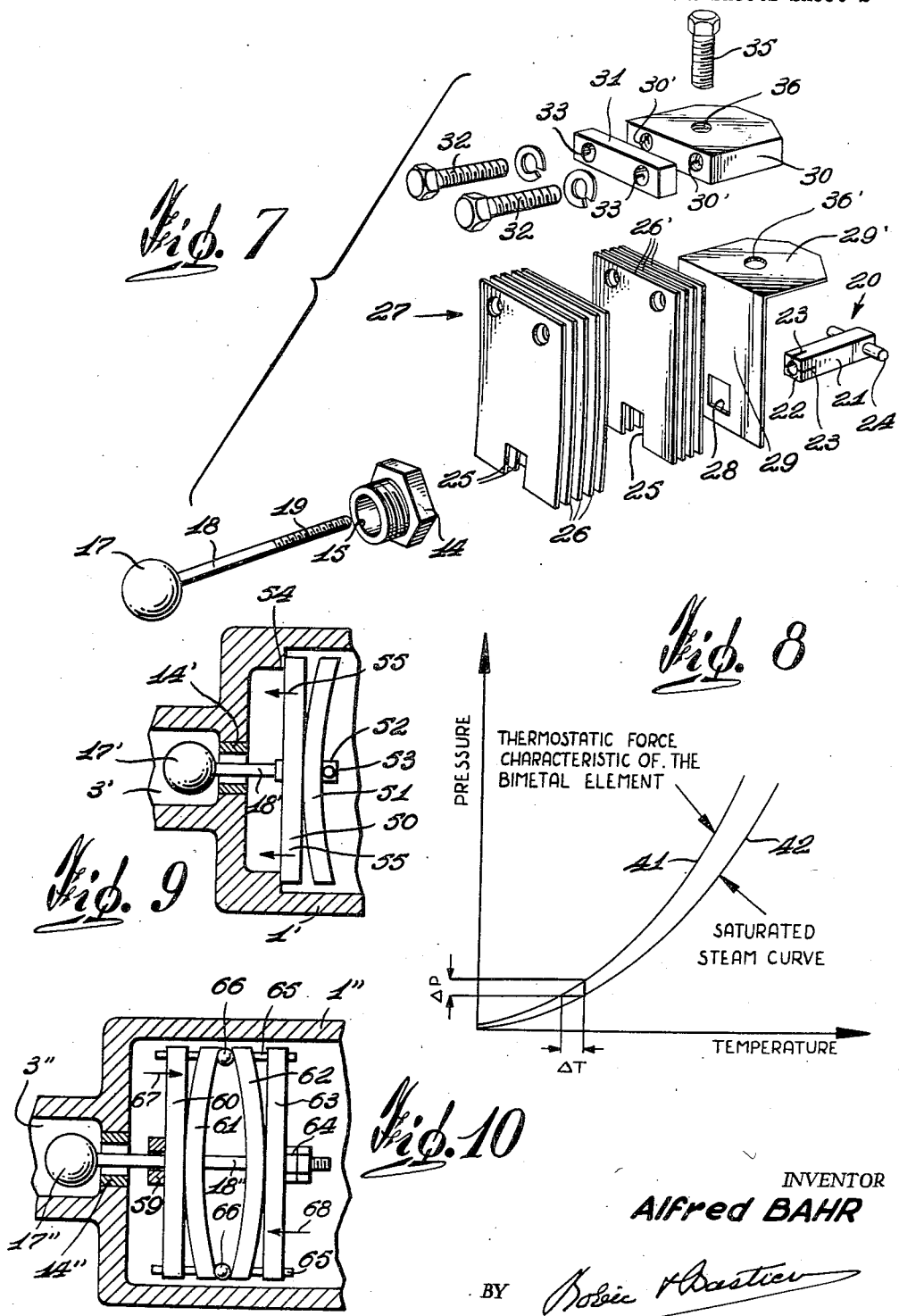

000000# United States Patent Office 2,781,173
Patented Feb. 12, 1957

2,781,173

STEAM TRAP

Alfred Bahr, Montreal, Quebec, Canada

Application August 15, 1956, Serial No. 604,129

13 Claims. (Cl. 236—59)

The present invention relates to improvements in bi-metallic elements used for operating a valve member in steam traps, and the like, of the type which are used for controlling the air venting and condensate draining of steam lines.

In certain known steam traps, the bi-metallic element is only capable of maintaining the valve member closed under the pressure of the steam over a rather narrow range of steam pressure.

In certain other known constructions, the bi-metallic element consists of a plurality of spaced apart segments, each segment being of graduated strength and acting successively in accordance with the rise of steam temperature and pressure. This construction enables the bi-metallic element to exert a thermostatic force on the valve member which increases with temperature in a discontinuous manner and is represented by a curve made of a plurality of straight lines in a thermostatic force versus temperature graph. Such a construction is illustrated in U. S. Patent No. 2,629,553 dated February 24, 1953 to Velan.

In said reference, when the first segment comes in contact with the stem head of the valve member it exerts an increasing force on the valve member which is a straight line function of the temperature rise of the steam within the steam trap; this continues until the second segment comes into operative contact with the stem head of the valve member whereby the combined force exerted by the two operating segments will exert a force which will still be a straight line function of the steam temperature but at a sharper angle. This will again take place for the third segment and so on for the successive segments.

The result is that the thermostatic force exerted by the bi-metallic element, according to said reference, may be represented by a series of straight lines following more or less the parabolic line of the saturated steam curve. It will, therefore, be obvious that with such an arrangement of the bi-metallic element, the temperature differential between the temperature of the saturated steam and the temperature of the condensate necessary to force the valve into closing position against the steam pressure will not be constant over the entire range of steam pressures and temperatures. In other words, for certain temperatures of the steam, the bi-metallic element, according to this reference, will be very sensitive and will discharge condensate at a temperature only slightly smaller than the temperature of the saturated steam, while for certain other values of the steam temperature, the condensate will be discharged at a much lower temperature than the temperature of the saturated steam.

The main object of the present invention is to devise an improved bi-metallic element which is so constructed that it will exert a thermostatic force, represented by a smooth curve on a temperature versus pressure graph, which will be as nearly identical as desired to the curve of the saturated steam and for a wide range of the saturated steam curve, for instance, from 0 lb. up to 200 lbs. per square inch pressure.

Another important object of the present invention is the provision of a bi-metallic element adapted to be used in steam traps or the like, which comprises at least two sets of metallic strips, one set having, in the cold state or at room temperature, a longitudinal curvature different from the strips of the other set, said sets being in closed contact with each other at their clamped portions. Said bi-metallic element is so arranged and constructed that the successive sets will add their thermostatic force to the first acting set in a continuously increasing manner so that the sum of the thermostatic forces exerted by the various sets will be in accordance with a smooth parabolic curve.

Yet another important object of the present invention is the provision of a steam trap of simple and rugged design and using the bi-metallic element according to the present invention.

The foregoing and other important objects of the present invention will become more apparent during the following disclosure and by referring to the drawings in which:

Figure 7 is an exploded perspective view of the bi-metallic element and valve member assembly;

Figure 8 is a graph of temperature versus pressure showing the saturated steam curve and the curve of the thermostatic force exerted by the bi-metallic element according to the present invention;

Figure 9 is a partial longitudinal diagrammatic section of another arrangement of the bi-metallic element according to the present invention; and Figure 10 is a partial longitudinal diagrammatic section of still another bi-metallic arrangement according to the present invention.

Figure 1:
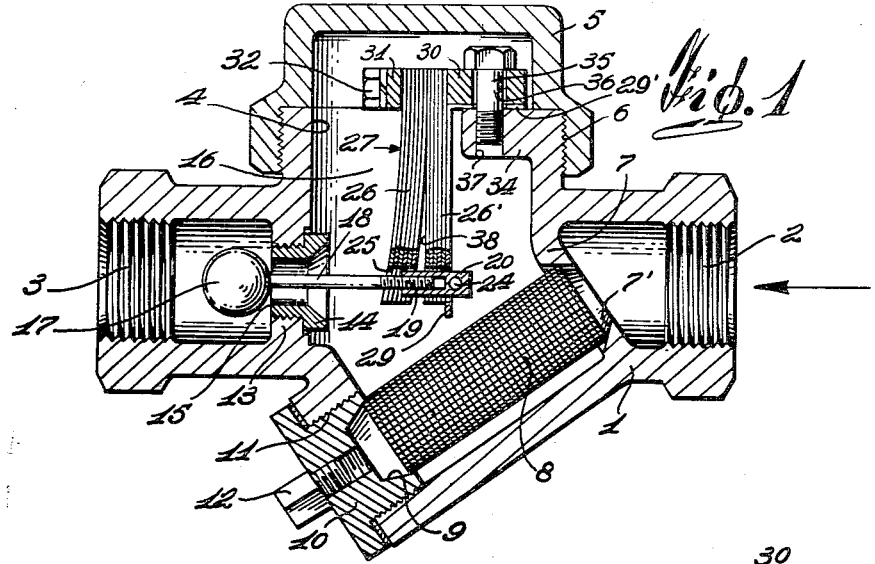
Figure 1 is a longitudinal section of a steam trap according to the present invention.
Figure 2:
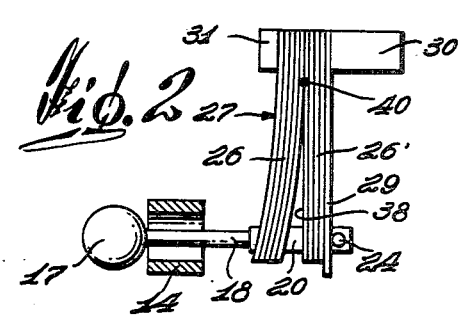
Figure 2 is a diagrammatic showing of the bi-metallic element and valve in the cold state, in which the valve is in the open position.

Referring now more particularly to the drawings in which like reference characters indicate like elements throughout, the steam trap, according to the present invention, comprises a housing 1 having a coaxial inlet 2 and an outlet 3 for the fluid and having an inspection opening 4 which has its axis substantially at right angles to the axis of the inlet and outlet 2 and 3. The inspection opening 4 is normally closed by a cap 5 in threaded engagement with external threads 6 on the housing 1.

An inclined partition 7 is disposed at the bottom of the inlet opening 2 and is provided with a central aperture having bevelled edges 7' adapted to seat the upper open end of a strainer 8. The strainer 8 extends downwardly at an angle and its lower open end seats in a tapered recess 9 made in a plug 10 threadedly engaging a servicing opening 11 made in the bottom of the housing 1. A screw 12 threadedly engages a draining bore made in the plug 10.

A partition 13 is disposed in the bottom of the outlet 3 and is provided with a threaded central aperture in which is threadedly engaged a sleeve 14 forming a valve seat at 15 which is disposed within the outlet 3 and externally of the steam and condensate chamber 16 formed by the housing 1. A spherical valve member 17 is disposed within the outlet 3 and is adapted to seat against the valve seat 15 in order to close the outlet of the chamber 16.

The valve member 17 is attached to a valve stem 18 which extends through the sleeve 14 and which has a threaded head end 19 adapted to threadedly engage a retaining or abutment member 20 which consists, as shown in Figure 7, of a block 21 provided with a cross pin 24 and having a threaded inner bore opening at the end 22 which is provided with longitudinal slits 23 for effecting locking of the threaded end 19 of the valve stem 18.

The valve stem 18 and member 20 engage notches 25 made in the free ends of the bi-metallic strips 26, 26', of a bi-metallic element, generally indicated at 27, and passes through an opening 28 made in the longer bi-metallic strip 29, while the cross pin 24 of the retaining member 21 is adapted to abut against the outside face of the bi-metallic strip 29.

The bi-metallic strips 26 and 26' are firmly secured together at their other ends between a block 30 and a bar 31 by means of bolts 32 which pass through holes 33 of the bar 31 and engage threaded bores 30' of the block 30. The block 30 and bi-metallic strip 29 are rigidly secured on a shelf 34 of the housing 1 by means of a bolt 35 which passes through an opening 36 of the block 30 and an opening 36 in the right angle portion 29' of the strip 29, and engages a threaded bore 37 of the shelf 34.

Figure 6:
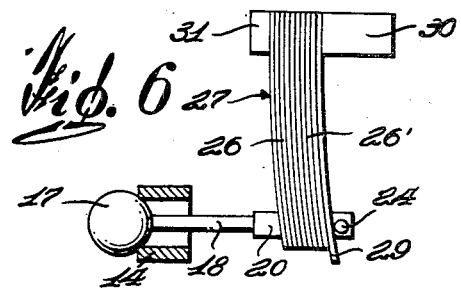

According to the present invention, the bi-metallic element 27 is constituted by at least two sets of individual bi-metallic strips 26 and 26', 29, the bi-metallic strips in each set having, at room temperature, substantially the same longitudinal curvature so as to be in contact with each other over their entire length, while the strips 26 of one set have a longitudinal curvature different from the strips 26' of the other set. More particularly, as shown in Figure 1, the set of bi-metallic strips 26 are, at room temperature or in the cold state, longitudinally and outwardly curved so as to lie at a gradually increasing distance from the strips 26' of the other set, the latter being straight over their entire length. Thus at room temperature there is a gap 38 between the two sets of strips and the area of contact of the innermost adjacent strips of each set is only at the clamped ends of said strips. With increasing temperature the two sets of strips bend in the same direction and the area of contact between the two sets of strips gradually increases and become closer and closer to the outer ends of the strips as denoted by the point 40 in Figures 2 to 5 inclusive, until at an elevated predetermined temperature the two sets of strips are in full contact, as shown in Figure 6. Thus the resultant thermostatic or valve pulling force P is:

$$P = \frac{L \times A + C_L \times B}{L}$$

wherein: A and B are the forces exerted by the strips 26' and 26 respectively, and are straight line functions of temperature; L and $C_L$ are the lever arms of the points of application of the forces A and B respectively relatively to the clamped ends of the sets of strips; L is obviously a constant while $C_L$ is a straight line function of temperature.

As $C_L \times B$ is a second degree curve because $C_L$ and B are both straight line functions, P will also be a function of the second degree with respect to temperature.

Figure 3:
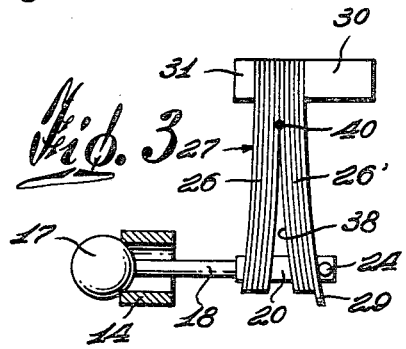
Figures 3 to 6 are diagrammatic views similar to that of Figure 2, showing the bi-metallic element in various states of curvature when subjected to increasing temperature.
Figure 4:
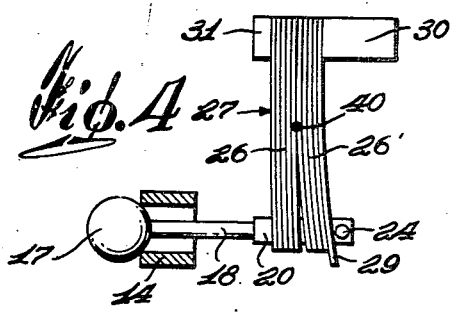
Figure 5:
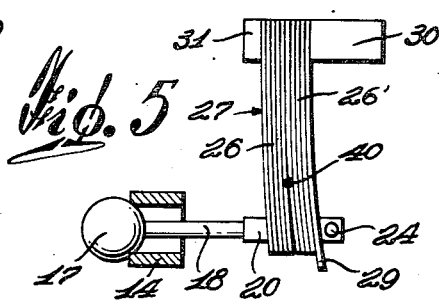

Referring to Figure 3 it will be seen that the set of bi-metallic strips 26' and 29 bend sufficiently to close the valve member 17 without any substantial assistance from the set of bi-metallic strips 26; this occurs at a steam pressure slightly above atmospheric pressure at which point the steam temperature is not high enough to cause significant decrease of the gap 38. The deflection of the bi-metallic element 27 under increasing temperature causes a continuously increasing thermostatic force to be exerted on the ball valve member 17 in accordance with the second degree curve 41 of Figure 8. The curve 41 is parabolic in shape and is very nearly identical to the curve 42 which is the saturated steam curve. It will be noted that by properly designing the bi-metallic strips 26 and 26', 29 of the two sets of strips, it is possible to have the curve 41 lying above the curve 42 but at as short a distance as desired so as to have ΔT and ΔP as small as desired. Because the point 40 in Figures 3 to 6 moves gradually towards the outer end of the metal bi-metallic strips it will result that the curve 41 is a true second degree curve, as explained above, and is not constituted by a series of interconnected straight lines. The resulting smooth curve is essential in order to make ΔT as small or as large as desired over the entire temperature and pressure range in order to obtain hot or cold condensate, that is a condensate having a temperature differential with respect to the temperature of the steam in the chamber 16, as small or as large as desired. It is also possible to have ΔT constant over the entire temperature and pressure range so that the condensate will be discharged at a temperature which will be at a constant temperature differential with respect to the temperature of the steam. For instance, the condensate may be discharged at a temperature of 10 to 30° F. lower than the temperature of the steam.

Due to the inherent characteristics of bi-metallic elements if there was a single set of bi-metallic strips all having the same longitudinal curvature in the cold state, the force exerted by said single set under increasing temperature would be represented by a straight line function on a pressure versus temperature graph, and therefore, this straight line curve would mean that a large temperature differential would be necessary to discharge condensate in certain parts of the saturated steam curve, whereas a very small temperature differential would be necessary in certain other parts of said saturated steam curve. With the arrangement according to the present invention in which at least two sets of differently curved bi-metallic strips are used and so constructed that one set gradually adds its thermostatic force to the other set with increasing temperature, it is possible to devise a bi-metallic element which will have a thermostatic force represented by a curve which will follow as closely as desired the saturated steam curve.

While in Figures 1 to 7 inclusive only two sets of bi-metallic strips 26 and 26', 29 have been illustrated, it is obvious and within the scope of the present invention that three or several sets may be used in the same manner in which the longitudinal curvature of each set will be different in the cold state of the bi-metallic element.

Although Figures 1 to 7 show a first embodiment of the bi-metallic element, said bi-metallic element may also be constructed in accordance with other embodiments as shown in Figures 9 and 10.

In Figure 9 it is seen that the housing 1' is provided with an outlet opening 3' in which is disposed a spherical valve member 17' which is provided with a valve stem 18' passing through the valve seat member 14' and through the middle of the first set of bi-metallic strips 50 and the second set of bi-metallic strips 51 and is threaded in a retaining member 52 which has a cross pin 53 engaging the outer face of the second set of bi-metallic strips 51. The first set of strips 50 has both its ends in abutment against a shelf 54 made in the housing 1'. The bi-metallic strips are so constructed as to deflect towards the valve member 17' with increasing temperature.

As in the first embodiment, it will be obvious that the contact area of the second set of strips 51 with the first set 50 will gradually increase, with temperature, on both sides of the stem 18 and towards the free ends of the bi-metallic elements, whereby the resultant thermostatic force of the bi-metallic element will increase according to a curve substantially similar to the curve 41 of Figure 8.

Figure 10 shows still another arrangement of the bi-metallic element. In this embodiment, the housing 1'' is provided with an outlet 3'' and with a valve seat 14'' and a stationary sleeve-like abutment member 59 which consists of a sleeve disposed inwardly of the outlet and coaxially of the valve seat 14''. The valve member 17'' is provided with a stem 18'' which passes through the stationary sleeve-like abutment member 59 and through the middle of two pairs of sets of bi-metallic strips 60, 61 and 62, 63. The threaded outer end of the stem 18″ is provided with nuts 64 which abut against the outer face of the outermost set 63. The bi-metallic strips 60 abut at their middle area against the stationary member 59. The strips of the bi-metallic element are maintained against rotation with respect to each other by means of rods 65 inserted through holes made in the outer ends of strips and on which is secured a transverse pin 66 which serves as a spacer member between the inner set of strips 61 and 62.

Under increasing temperature, the sets of strips 60 and 61 are adapted to deflect in a direction away from the valve member 17″ in accordance with the arrow 67, while the set of strips 62 and 63 are adapted to deflect in the direction of arrow 68 towards the valve member 17″. Due to the fact that each set of strips in the pairs of sets 60, 61 and 62, 63 have different longitudinal curvature at room temperature, the resultant thermostatic force exerted by the bi-metallic element will be represented by a curve similar to curve 41 of Figure 8. The arrangement of Figure 10 will provide a steam trap capable of more valve travel and therefore more flow capacity than the arrangement of Figure 1.

The steam trap provided with a bi-metallic element according to the present invention operates as follows:

Referring to Figure 1, it will be understood that the valve member 17 can move freely forward and backward relatively to the valve seat 15 because the head end 19 of the valve stem 18 and the retaining member 20 provide only a movable support which is free of the bi-metallic element 27. The movement of the valve member 17 in a direction to open the steam trap is limited by the adjusted position of the retaining member 20 on the threaded end 19 of the valve stem 18. As the bi-metallic element 27 is rigidly secured to the housing 1 of the trap within the chamber 16, under actuation by the heat of the steam entering the chamber 16 through the strainer 8, the bi-metallic element will deflect in a direction away from the valve member 17 as clearly shown in Figures 2 to 6 inclusive. The pulling force exerted on the valve member 17 by the bi-metallic element will cause closing of the valve. When cooler condensate enters the chamber 16, the drop in temperature allows the bi-metallic element 27 to deflect in a direction toward the valve member 17 allowing said valve member to be forced from the valve seat into open position under the pressure of steam existing within the chamber 16.

In operation and with reference to Figure 1, the trap is shown in a position where the equipment is started up from a cold inoperative position. There is no steam in the line so that only air and cold water is being pressed out from the equipment lines by the steam pressure. This pressure acts on the valve member 17 and keeps the same in open position so that the trap is open and the pressure line is connected with the return line. In this position the valve member acts as an air vent allowing an initial blast discharge of air and cold water. As the steam enters the trap, it heats up the bi-metallic element 27 which causes the valve member to seat against the valve seat 15 and close the trap with a force depending on the temperature at which the bi-metallic element 27 is subjected and which, according to curve 41 in Figure 8, is slightly higher than the steam pressure existing within the chamber 16. As condensate accumulates within the chamber 16 and its level gradually rises to at least partly immerse the bi-metallic element, the latter is cooled to a temperature below the temperature of the steam within the chamber 16 and causes opening of the valve member 17 whereby the condensate is discharged through the outlet 3 into the return line of the equipment system. When the condensate has been discharged, the bi-metallic element is again heated by the steam entering the trap and again forces the valve member 17 into closing position.

While preferred embodiments according to the present invention have been illustrated and described it is understood that various modifications may be resorted to without departing from the spirit and scope of the appended claims.

I claim:

1. A bi-metallic element comprising at least two bi-metallic strips, one strip having, in the cold state, a longitudinal curvature different from that of the other strip, said strips being clamped together over a limited portion thereof and such that they are in direct contact with each other in said clamped portion while in the unclamped portion they are gradually divergent from each other in a direction away from said clamped portion, said strips being so constructed as to deflect in the same direction under a rise in temperature and such that said strips will come in mutual contact over a progressively and continuously increasing area under the temperature rise until both of said strips are in full length contact at a predetermined temperature whereby the thermostatic force exerted by said bi-metallic element on a member connected thereto can be represented by a smooth second degree curve.

2. A bi-metallic element as claimed in claim 1, wherein the clamped portion of said strips is at one end of said strips while the remaining portions of said strips are free from each other.

3. A bi-metallic element as claimed in claim 1, wherein the clamped portion of said strips is at the middle thereof while the two end portions on both sides of said clamped portion are free from each other.

4. A bi-metallic element comprising at least two sets of bi-metallic strips, the strips within each set having substantially the same longitudinal curvature in the cold state so as to be in contact with each other over substantially their entire length, the strips of one set having, in the cold state, a longitudinal curvature different from the longitudinal curvature of the strips of the other set, the strips of both sets being clamped together over a limited portion thereof and such that one of the outer strips of one set is in direct contact with one of the outer strips of the other set in said clamped portion of said strips, both sets being so constructed as to deflect in the same direction under a rise of temperature and such that said ones of the outer strips of both sets will gradually increase their contact area from said clamped portion towards the unclamped portion of said sets under a rise of temperature, so that the combined thermostatic force exerted by said bi-metallic element on a member connected thereto will be defined by a substantially smooth second degree curve similar to the curve of the saturated steam in a temperature versus pressure graph.

5. A bi-metallic element as claimed in claim 4, wherein the clamped portion of said two sets of strips is at one end of said strips.

6. A bi-metallic element as claimed in claim 4, wherein the clamped portion of said sets of strips is at the middle of said strips while both ends of said sets are free from each other.

7. A bi-metallic elements as claimed in claim 4, wherein the bi-metallic strips of one set are straight, while the bi-metallic strips of the other set are longitudinally curved in a direction away from the strips of said one set.

8. In a steam trap comprising a body provided with a fluid chamber and with inlet and outlet passages to the chamber, the outer end of the outlet passage being provided with a valve seat, a valve member having an elongated integral stem extending through said valve seat and said valve member being outside said fluid chamber, a bi-metallic element disposed within said fluid chamber and having one portion secured to said body and having its other portion in operative connection with said valve stem and so constructed that deflection of said bi-metallic element under a temperature rise will act on said valve stem and valve member to move said valve member into valve closing position, said bi-metallic element comprising at least two bi-metallic strips having a limited portion clamped together and having in the cold state different longitudinal curvature so as to be in contact with each other only in said limited portion thereof, and so constructed that under a rise in temperature said strips will deflect in the same direction and such that they will gradually come in full contact with each other over their entire length such that one strip only will cause closing of said valve member at a relatively low temperature while the other strip will gradually add its thermostatic force to said first strip with a continuous rise in temperature such that the combined thermostatic force of the two strips may be represented by a second degree curve substantially similar to the saturated steam curve in a pressure versus temperature graph.

9. In a steam trap according to claim 8, wherein the clamped portion of said two strips is at one end of said strips whereas the other end of said strips are in operative connection with the valve stem of said valve member.

10. In a steam trap as claimed in claim 9, wherein the clamped portion of said strips is rigidly secured to said housing.

11. In a steam trap as claimed in claim 8, wherein said strips are clamped together at their middle portions and said valve stem passes through said middle clamped portions and is operatively connected thereto while the free end of at least one strip is in engagement with abutment surfaces of said housing.

12. In a steam trap as claimed in claim 8, wherein there is at least two pairs of sets of strips, the sets of strips in each pair being differently longitudinally curved, the sets of strips of both pairs being adapted to deflect in opposite directions under a temperature rise, the valve stem of said valve member freely passing through the centre portions of said strips and the sets of strips in each pair being clamped at the centre portion thereof, and an abutment member having a central bore and rigidly secured within said fluid chamber and through which said valve stem freely passes, and one outer strip of said sets of strips being in abutting contact therewith while said valve stem is provided with an abutment member in contact with the other outer strip of said sets of strips.

13. In a steam trap as claimed in claim 8, wherein there are several bi-metallic strips in each set of strips.

References Cited in the file of this patent

UNITED STATES PATENTS 2,629,553     Velan _____ Feb. 24, 1953